United States Patent [19]
Okayama

[11] Patent Number: 4,877,630
[45] Date of Patent: Oct. 31, 1989

[54] RICE COOKIE AND METHOD FOR PRODUCING SAME

[75] Inventor: Tetsuro Okayama, Kobe, Japan

[73] Assignee: Uegaki Beika Kabushiki Kaisha, Kobe, Japan

[21] Appl. No.: 205,455

[22] Filed: Jun. 10, 1988

[30] Foreign Application Priority Data

Jun. 19, 1987 [JP] Japan ................................ 62-154182

[51] Int. Cl.⁴ .......................... A21D 8/00; A23L 1/10
[52] U.S. Cl. .................................... 426/302; 426/541; 426/558; 426/618; 426/622
[58] Field of Search ............... 426/549, 622, 558, 618, 426/302

[56] References Cited

U.S. PATENT DOCUMENTS 3,975,550 8/1976 Fioriti et al. ........................ 426/553
4,734,289 3/1988 Yamaguchi et al. ................ 426/622

FOREIGN PATENT DOCUMENTS 2050062 8/1971 Fed. Rep. of Germany .

OTHER PUBLICATIONS

The Bakers Digest-By Ferne Bowman, Willene Dilsaver and Klaus Lorenz-Title "Rationale for Baking Wheat-, Gluten-, Egg-, and Milk-Free Products'-'-Date-Apr. 1973, pp. 15-18, 21-22.

Primary Examiner—Donald E. Czaja
Assistant Examiner—Mary S. Mims
Attorney, Agent, or Firm—Marshall, O'Toole, Gerstein, Murray & Bicknell

[57] ABSTRACT

This disclosure relates to a rice cookie comprising glutinous or regular rice flour as the main ingredient and about half of the flour's weight in oil or fat, sweetener and egg white. Liquids (milk or milk and water), equalling 35-45% in total weight of the ingredients are added to make a dough which is then baked. A method for producing the rice cookie includes making a dough which comprises glutinous or regular rice flour as the main ingredient, mixed with about half of the flour's weight in oil or fat, sweetener, and egg white. While these materials are being mixed, liquids (milk or milk and water), equalling 35-45% in total weight of the materials are added to make the dough. The dough is then baked in an oven; during the baking process, steam is allowed to escape.

5 Claims, 2 Drawing Sheets

RICE COOKIE AND METHOD FOR PRODUCING SAME

FIELD AND BACKGROUND OF THE INVENTION

This invention relates to rice cookies with glutinous or regular rice flour as the main ingredient and the method for producing same.

The usual procedure for manufacturing various kinds of rice crackers consists of freeze-drying rice cake dough made of glutinous rice flour which has been simultaneously steamed and kneaded. The rice cake dough is then baked or fried.

Since the process up to and including the stage of making rice cake dough as described above is complex and takes a long time (usually about one week), the cost of production is high. Recently, cheese, nuts, etc., have been added to these rice crackers. However, even these newly developed rice crackers have a typically Japanese appearance and hard texture, and are, therefore, not suitable for consumption with tea or coffee.

On the other hand, cookies usually consumed with tea or coffee and made of wheat flour as the main ingredient contain a large proportion of fats or shortening and sugar and are thus high in calories. Such cookies are, therefore, avoided by people who are dieting.

SUMMARY OF THE INVENTION

In order to solve the problems described above, a new process has been developed, which is simple, takes little time, and results in a low-calorie product with a soft texture suitable for consumption with tea or coffee.

A rice cookie in accordance with this invention achieves the above-mentioned purpose and comprises glutinous or regular rice flour as the main ingredient and about half of the flour's weight in oil or fat, sweetener and egg white. Liquids containing milk products (milk or milk and water), equalling 35–45% in total weight of the ingredients are added to make a dough which is then baked.

A method in accordance with this invention for producing the rice cookie includes making a dough which comprises glutinous or regular rice flour as the main ingredient, mixed with about half of the flour's weight in oil or fat, sweetener, and egg white. While these materials are being mixed, liquids containing milk products (milk or milk and water), equalling 35–45% in total weight of the materials are added to make the dough. The dough is then baked in an oven; during the baking process, steam is allowed to escape.

The rice cookie and the method for producing same according to this invention having the following advantages:

1. Since the product contains a certain amount of oil or fat, it has a soft yet crunchy texture compared to rice crackers and is suitable for consumption with tea or coffee.

2. The amount of fats in most cookies is up to double that of wheat flour in weight. Since the glutinous or regular rice flour (especially glutinous rice flour), used in the product has a higher viscosity than wheat flour, the amount of oil or fat required is only half of that of the rice flour in weight. This results in a cookie which is low in calories, light, and easy to digest.

3. Since glutinous or regular rice is naturally sweet, the amount in weight of added sweetener in the product is less than that used in most cookies. This result, combined with the second advantage mentioned above, allows for a low-calorie product suitable for diet food.

4. The surface of the product after baking is smooth and fine-textured, so that liquids cannot be absorbed easily.

For this reason, a variety of flavorings can be coated or sprayed onto the surface to produce different flavors of cookies.

5. Since the process is simple and takes little time, the cost is lower than that for producing rice crackers.

6. Although the water content of the dough is rather high at 35–45%, allowing the steam to escape during the baking process results in the product maintaining a consistent shape until the end of the baking process.

BRIEF DESCRIPTION OF THE INVENTION

The foregoing objects and advantages of the present invention will be better understood from the following detailed description taken in conjunction with the figures of the accompanying drawings, wherein.

DETAILED DESCRIPTION OF THE INVENTION

The following is a detailed explanation through examples of the invention of the rice cookies and the method for producing same.

EMBODIMENT 1 (FIGS. 1 AND 2)

This embodiment shows the ingredients of the rice cookie and their proportions in weight: glutinous rice flour—100, vegetable fat (margarine)—50, sweetener (malt sugar)—12.5, dried egg white (powdered)—5, milk—50, and water—35.

First, margarine and malt sugar, in the proportions described above, are placed in a vessel and thoroughly mixed. Then, dried egg white is added. Water is added gradually while stirring. If raw egg whites are used, addition of the water is not necessary.

Next, glutinous rice flour, in the proportion described above, is added to the ingredients in the vessel, after which milk is added gradually while stirring. When all materials are thoroughly mixed, the dough for the rice cookies is obtained. In this example, the dough will contain a total percentage of liquids by weight of 38.8% (based on the following measured water content of: margarine—16%; glutinous rice flour—11%; milk—88%).

Next, the dough is placed in a pastry bag or similar device and squeezed onto an oven tray in several separate hemispherical mounds. the tray is then placed in an oven heated to approximately 190° C. After the cookies are baked for approximately fifteen minutes, the oven door is opened to let the steam escape. The door is then closed and baking continues at the same temperature for approximately four minutes.

Figure 1:
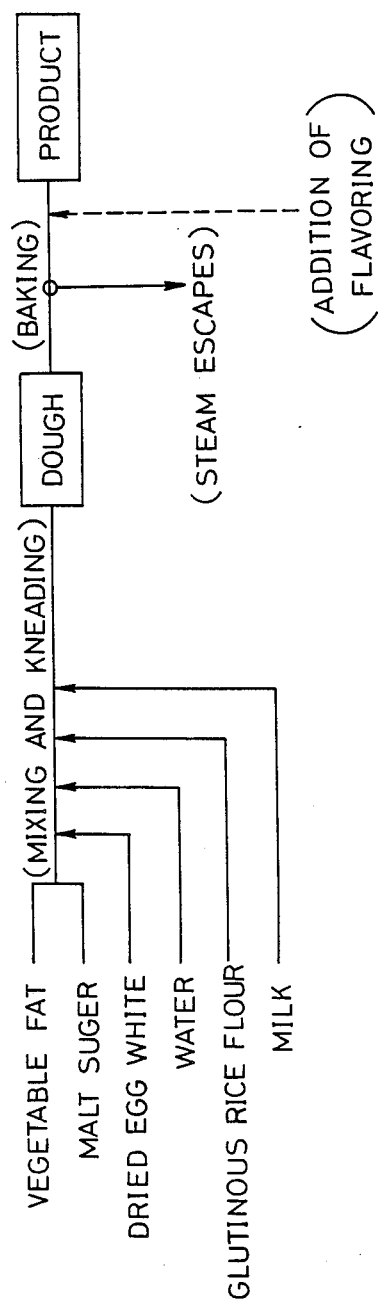
FIG. 1 is a schematic flow diagram showing the materials and process for manufacture of a rice cookie produced according to this invention.
Figure 2:
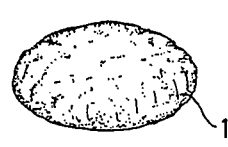
FIG. 2 is a perspective view of a rice cookie in accordance with a first embodiment of the invention.

At this time, the tray is removed from the oven and filled with pump rice cookies (cookie 1), as shown in FIG. 2. Although this rice cookie is suitable for consumption as is, the product is improved by the addition of one or more flavorings, such as soy sauce, sweet sake, garlic, curry powder, onion, salt, pepper, and various chemical flavorings. These maybe coated or sprayed onto the cookie and air-dried.

With this process, a rice cookie is obtained which is softer, crunchier and has a more agreeable texture then traditional Japanese rice crackers.

EMBODIMENT 2 (FIG. 3)

Emodiment 2, which is rice cookie 2, comprises two layers, each of which is thinner than cookie 1. Between these to layers 2', a filling 2a of cheese, jam, etc., is placed to produce a sandwich-type product. This dough contains more milk by weight, (the ratio of glutinous rice flour to milk of water is 100:70), resulting in a total water content by weight of 42.4%. Because it is softer than the dough for cookie 1, the dough should be squeezed into cylindrical cookie forms palced on the oven tray.

Next, the tray is placed in an oven heated to approximately 190° C., and baked for approximately eleven minutes, after which the oven door is opened to let the steam escape. The door is then closed again, and baking continues at this temperature for approximately four minutes. The tray is removed from the oven and the cookies are removed from the cookie forms.

Figure 3:
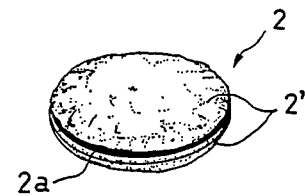
FIG. 3 is a perspective view of a rice cookie in accordance with a second embodiment.
Figure 4:
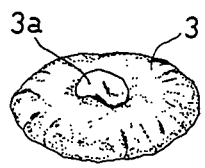
FIG. 4 is a perspective view of a rice cookie in accordance with a third embodiment.
Figure 5:
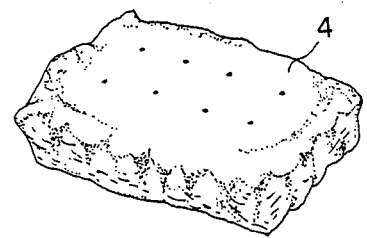
FIG. 5 is a perspective view of a rice cookie in accordance with a fourth embodiment.

This process results in a single, overall thin rice cookie layer 2'. By placing a filling 2a between the two cookie layers 2', a rice cookie 2 as shown in FIG. 3 is obtained.

EMBODIMENT 3, (FIG. 4)

Embodiment 3, which is rice cookie 3, has a thickness between that of the rice cookies 1 and 2. It has an almond, cashew nut 3a or other nuts placed upon the center of the upper surface. Because the dough for rice cookie 3 has a consistency between that of the rice cookies 1 and 2, (the weight ratio of glutinous rice flour to milk or water is 100:60), the dough can be directly squeezed in separate hemispherical mounds onto the oven tray, after which a cashnew nut 3a is pressed into the center of the upper surface.

Next the tray is placed in an oven heated to approximately 190° C. and baked or approximately 14 minutes. Then, the over door is opened to let the steam escape. The door is closed and baking continues at the same temperature for approximately three minutes and thirty seconds. The tray is then removed from the oven.

Rice cookie 3 is very similar in appearance and texture to most cookies.

EMBODIMENT 4, (FIG. 5)

Embodiment 4, which is rice cookie 4, has a pie-like appearance and texture. The dough for the cookie 4 is rolled out into thin layers, several of which are placed on top of each other and baked. The materials and baking process are the same as those for embodiment 1.

The following table shows the relationship between total water content and product quality. Note: Items c, d and e corresponding to embodiments 1, 3, and 2, respectively. Embodiment 4 is not shown in this table.

|  | a | b | c | d | e | f |
|---|---|---|---|---|---|---|
| vegetable fat | 250 g | 250 g | 250 g | 250 g | 250 g | 250 g |
| malt sugar | 62.5 g | 62.5 g | 62.5 g | 62.5 g | 62.5 g | 62.5 g |
| dried egg white | 25 g | 25 g | 25 g | 25 g | 25 g | 25 g |
| glutinous rice flour | 500 g | 500 g | 500 g | 500 g | 500 g | 500 g |
| water | 175 g | 175 g | 175 g | 175 g | 175 g | 175 g |
| milk | 100 g | 200 g | 250 g | 300 g | 350 g | 450 g |
| Total water content of dough | 32.2% | 36.8% | 38.8% | 40.7% | 42.4% | 45.5% |
| Consistency for squeezing | X | △ | ⊙ | ○ | △ | X |
| Condition after baking | a 1 | b 1 | c 1 | d 1 | e 1 | f 1 |
| Baking time | 16 m 20 s | 19 m | 19 m | 17 m 30 s | 15 m | 13 m |
| Product evaluation | a 2 | b 2 | c 2 | d 2 | e 2 | f 2 |

X: poor, △: not poor, ○: good, ⊙: very good
a ①: greasy surface, burns easily
b ①: greasy surface, burns rather easily
c ①: satisfactory
d ①: rather greasy surface
e ①: greasy surface
f ①: greasy surface
a ②: extremely hard, cracks very easily, very rough surface
b ②: rather hard, cracks easily, rough surface
c ②: good texture, plump
d ②: good texture, tends to spread
e ②: good texture, spreads
f ②: good texture, spreads to much As can be seen in the above table, the total water content of dough should be between 35% and 45%. Furthermore, the process for embodiments 1, 2 and 3, from mixing the ingredients up to and including the end of baking, takes about 30 minutes.

In addition, the resulting product is the same whether or not foam is produced when the vegetable fat, egg white, and glutinous rice flour are mixed.

The use of glutinous rice flour will result in a superior texture, although similar rice cookies have been obtained with regular rice flour. Furthermore, it is thought that similar cookies can be obtained with the use of starch instead of glutinous or regular rice flour.

It has been found that the addition of grated Japanese yam and/or gluten to the dough results in a better texture of the rice cookie.

What is claimed is:

1. A rice cookie comprising a glutinous rice flour as the main ingredient, and oil or fat, sweetener, and egg white mixed with said flour, the amount of oil or fat being approximatey half of the weight of said flour, and liquid containing milk products equalling 35-45% in total weight of the aforementioned ingredients being added to make a dough which is then baked.

2. A cookie as set forth in claim 1, and further comprising a flavoring added after baking.

3. A method for producing a rice cookie, comprising the steps of making a dough which comprises glutinous rice flour as the main ingredient, mixed with said flour, oil or fat, sweetener, and egg white, the amount of oil or fat being approximately 50% of the weight of said flour, and while these materials are being mixed, liquid containing milk products equalling 35-45% in total weight of the materials being added to make the dough, and then baking the dough in an oven, whereby during the baking process, steam is allowed to escape.

4. The method for producing the rice cookie as claimed in claim 3 wherein a baking temperature of approximately 190° C. is employed.

5. The method for producing the rice cookie as claimed in claim 3 and further comprising coating or spraying soy sauce, sweet sake, etc., onto the rice cookie for flavoring.

* * * * *